Jan. 15, 1957  F. M. BRAWAND  2,777,182
SPLIT CHOKER HOOK
Filed Jan. 19, 1953
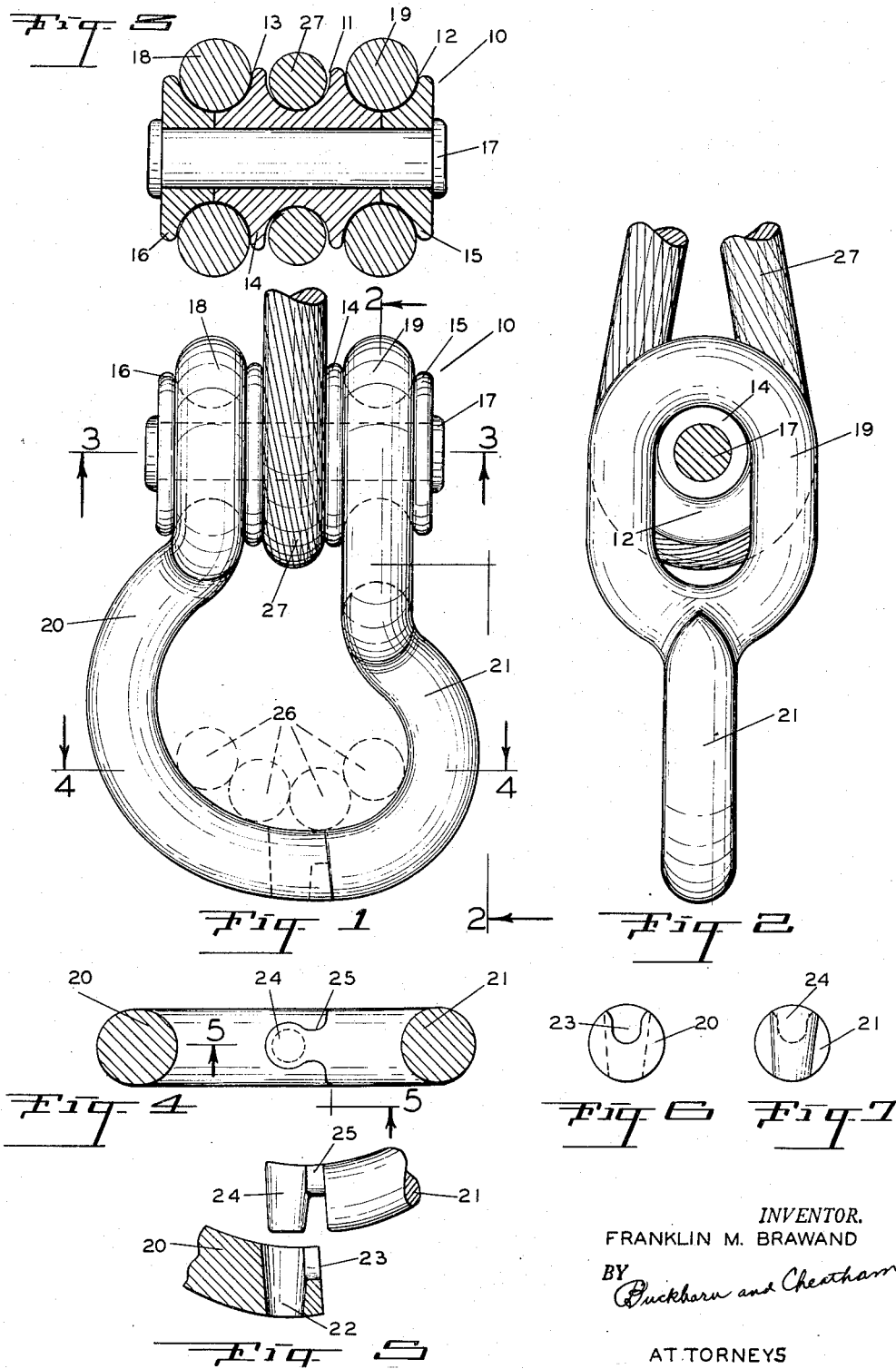
INVENTOR.
FRANKLIN M. BRAWAND
BY Buckhorn and Cheatham
ATTORNEYS

United States Patent Office 2,777,182
Patented Jan. 15, 1957

2,777,182

SPLIT CHOKER HOOK

Franklin M. Brawand, Estacada, Oreg.

Application January 19, 1953, Serial No. 331,879

5 Claims. (Cl. 24—242)

My present invention comprises a load supporting device which may be referred to as a split choker hook. The invention is particularly adapted for use in removing fallen timber from forests, and may comprise an end member to be attached to a draft cable in a timber arch or other device for hauling logs. The device is also useful in any lifting or hauling apparatus as a means for attaching choker cables, cargo slings, or other load supporting devices to a draft cable.

The principal object of the present invention is to provide a device of the character described, which is sturdy, relatively easily manufactured, and which cannot become jammed in use. A principal drawback of prior devices of this character with which I am familiar is that a plurality of choker cables engaged therewith may be so jammed upon each other as to prevent disassociation thereof from the device without considerable effort and the use of sledges or other means to disengage the cables from each other. In the present invention, while the cables may twist about over each other, it is virtually impossible for them to become so interlocked, or to jam relatively movable parts of the device, as to prevent easy manual disengagement of the device from the cables.

A further object of the present invention is to provide a device of the character described which may be easily operated to provide a closed link for engaging a plurality of choker cables or the like.

The objects and advantages of the present invention will be more readily apparent from inspection of the following specification taken in connection with the accompanying drawings wherein like numerals refer to like parts throughout.

In the drawings,

Fig. 1 is a view in elevation of the present invention in closed condition, the device being associated with a draft cable;

Fig. 2 is a side view of Fig. 1, with a portion thereof in section substantially along line 2—2 of Fig. 1;

Fig. 3 is a horizontal section looking upward and taken substantially along the line 3—3 of Fig. 1;

Fig. 4 is a horizontal section looking downward from the plane of the line 4—4 of Fig. 1;

Fig. 5 is a partial view, in side elevation, with part broken away along the line 5—5 of Fig. 4, showing the parts in separated relation;

Fig. 6 is an end view, in elevation, of one of the hooks of the device; and

Fig. 7 is an end view, in elevation, of the other hook of the device.

The device comprises a rigid support 10 comprising a substantially cylindrical body having a plurality of annular peripheral grooves therein, said grooves comprising a central groove 11 and a pair of outer grooves 12 and 13 symmetrically disposed on opposite sides of central groove. For ease of assembly the support comprises a plurality of separate portions comprising an inner portion 14 and a pair of identical outer portions 15 and 16. The three portions are provided with longitudinal, coaxial bores of equal diameter through which fastening means such as a rivet 17 is passed and peened over in order rigidly to hold the three portions together to provide a rigid support. The adjacent end surfaces of the portions 14, 15 and 16 lie in planes normal to the axis of the support at the bottoms of the grooves 12 and 13 whereby eyes 18 and 19, respectively, of a pair of hooks 20 and 21 may be engaged with the grooves prior to riveting the portions together. The eye 18 is annular and closely embraces the support within the groove 13 so that the hook 20 is pivotally mounted on the support and radially fixed with respect thereto, while the eye 19 is elongated in the radial direction so that the hook 21 is pivotally mounted upon the support and radially movable with respect thereto.

The free ends of the hooks 20 and 21 are provided with complementary interlocking means which may be interengaged upon relative movement of the free ends in a radial direction whereby to provide a closed link pivotally dependent from the rigid support. In the preferred embodiment the free end of the hook 20 is provided with a radially directed opening 22 which may be outwardly tapered, the inner end of which is intersected by a longitudinally extending groove 23 extending to the end of the hook; and the hook 21 is provided with a finger comprising a radially directed plug 24 adapted to engage in the opening 22 and a connecting portion 25 adapted to engage in the groove 23. The plug 24 is preferably outwardly tapered so as rather snugly to engage in the opening 22, but is deliberately made undersize so that, upon engagement of the connecting portion 25 with the bottom of the groove 23, the plug is prevented from being jammed into tight frictional engagement with the wall of the opening 22. The connecting portion 25 is likewise slightly smaller in dimensions than the groove 23, and clearance is otherwise provided so that, while a relatively snugly fitting structure is provided, jamming is impossible. The hooks 20 and 21 face inwardly and their free ends overlap so that upon relative radial movement of the hook ends, as permitted by the elongated eye 19, the free ends may be interlocked as shown in Figs. 1 and 2. When the hook 21 is moved inwardly, the plug 24 is moved beyond the free end of the hook 20 and the hooks may be moved angularly with respect to each other to permit the association or disassociation of load carrying cables or the like. The hooks preferably comprise curving members, so arranged that the interengaged free ends are most remote from the support whereby choker cables or the like, indicated in dash outline at 26, will slide down onto the interengaged ends when the device is subjected to strain. The bights of the hooks are so open that it is impossible for two or more choker cables to jam into one of the hooks. The axes of the plug 24 and opening 22 are preferably in radial alignment with the center of the groove 11 so that the tendency is for the load supporting choker cables or the like to hold the link firmly closed when subjected to strain through a draft cable 27 or the like engaged with the central groove 11. Because of the relatively small size of the annular eye 18 with respect to the elongated eye 19, the hook 20 provides a longer hook portion upon which a plurality of choker cables or the like may be seated prior to interlocking of the ends of the hooks.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. A load supporting device comprising a rigid support, said support comprising a substantially cylindrical construction having a central, peripheral groove for reception of the bight of a draft cable eye, and a pair of outer, peripheral grooves on opposite sides of said central groove, a first open hook having an eye engaging one of said outer grooves, and a second open hook having an elongated eye slidably engaging the other of said outer grooves whereby said second hook may be shifted radially with respect to said support, the free ends of said hooks overlapping, one of said hook ends being provided with a radially directed opening and the other of said hook ends being provided with a radially directed finger capable of being inserted into said opening upon outward radial movement of said second hook whereby said hooks may be interlocked to provide a closed link pivotally dependent from said support.

2. The construction set forth in claim 1 wherein the free ends of said hooks are most remote from said support when interengaged whereby choker cable eyes or the like engaged in the closed link formed by said hooks will overlie the interlocked ends thereof when the draft cable is tensioned.

3. The construction set forth in claim 1 wherein said support comprises a plurality of separate portions complementarily defining said outer grooves with their meeting faces extending in planes normal to the axis of the support along the bottoms of said grooves and each having a central longitudinal bore therethrough, and means extending through the aligned bores thereof for retaining said members in coaxial, contiguous relation to each other.

4. The construction set forth in claim 1 wherein said support comprises a plurality of separate portions complementarily defining said outer grooves with their meeting faces extending in planes normal to the axis of the body along the bottoms of said grooves and each having a central longitudinal bore therethrough, and a rivet extending through the aligned bores and permanently retaining said members in coaxial, contiguous relation to each other.

5. A load supporting device comprising a rigid support, said support comprising an elongated construction having a central, annular groove for reception of the bight of a draft cable eye, and a pair of outer annular grooves, a first open hook having an annular eye encircling said support within one of said outer grooves, and a second open hook having an elongated eye slidably embracing said support and engaged in the other of said outer grooves whereby said second hook may be shifted radially with respect to said support, the free ends of said hooks overlapping, one of said hook ends being provided with a radially directed opening and the other of said hook ends being provided with a radially directed finger capable of being inserted into said opening upon outward radial movement of said second hook whereby said hooks may be interengaged to provide a closed link pivotally dependent from said support, the portion of said link defined by the interengaged ends of said hooks being most remote from said support whereby choker cables or the like engaged in said link will exert pressure on said finger in a radially outward direction when subjected to load.

References Cited in the file of this patent

UNITED STATES PATENTS

| | | |
|---|---|---|
| 249,177 | Healey | Nov. 8, 1881 |
| 1,367,270 | McKinney | Feb. 1, 1921 |
| 1,686,424 | Thomson et al. | Oct. 2, 1928 |